US007107317B2

(12) United States Patent
Demsky et al.

(10) Patent No.: US 7,107,317 B2
(45) Date of Patent: Sep. 12, 2006

(54) TARGETED INFORMATION DELIVERY TO MULTIPLE USERS

(75) Inventors: Scott H. Demsky, Boca Raton, FL (US); Donald A. James, Round Rock, TX (US); James J. Toohey, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 646 days.

(21) Appl. No.: 10/178,580

(22) Filed: Jun. 24, 2002

(65) Prior Publication Data

US 2003/0236839 A1    Dec. 25, 2003

(51) Int. Cl.
*G06F 15/16* (2006.01)
(52) U.S. Cl. ...................... 709/207; 709/202
(58) Field of Classification Search ............... 709/207, 709/202, 224, 248, 227; 707/102, 10; 717/7, 717/9; 705/1, 26
See application file for complete search history.

(56) References Cited

U.S. PATENT DOCUMENTS

| | | | | |
|---|---|---|---|---|
| 5,392,400 A | * | 2/1995 | Berkowitz et al. | 709/203 |
| 5,629,981 A | | 5/1997 | Nerlikar | 380/25 |
| 5,864,684 A | * | 1/1999 | Nielsen | 709/206 |
| 5,996,077 A | | 11/1999 | Williams | 713/201 |
| 6,014,138 A | * | 1/2000 | Cain et al. | 715/826 |
| 6,047,288 A | | 4/2000 | Kurosawa et al. | 707/9 |
| 6,138,139 A | * | 10/2000 | Beck et al. | 709/202 |
| 6,151,620 A | | 11/2000 | Madsen et al. | 709/204 |
| 6,219,706 B1 | | 4/2001 | Fan et al. | 709/225 |
| 6,282,547 B1 | * | 8/2001 | Hirsch | 707/102 |
| 6,442,558 B1 | * | 8/2002 | Brown et al. | 707/102 |
| 6,480,885 B1 | * | 11/2002 | Olivier | 709/207 |

FOREIGN PATENT DOCUMENTS

| | | |
|---|---|---|
| JP | 08-293925 | 11/1996 |
| JP | 10-254758 | 9/1998 |
| JP | 2000-357195 | 12/2000 |
| JP | 2001-257008 | 12/2001 |

OTHER PUBLICATIONS

V. Sunderam, et al., *Collaborative Computing Frameworks, Proc. of ACM/IEEE Super Computing '98: 10th Anniversary, High Performance Networking and Computing Conference*, pp. 10, (1998).
H.P. Dommel, et al., *Comparison of Floor Control Protocols for Collaborative Multimedia Environments, Proceedings of the SPIE—The International Society for Optical Engineering Conference*, vol. 3528, pp. 307-318, (1999).
E. Hinsch, et al., *Experiences With the Secure Conferencing User Agent: A Tool to Provide Secure Conferencing with MBONE Multimedia Conferencing Applications, Proceedings of JENC7, 7th Joint European Networking Conference*, pp. 231/1-7, (1996).
M.A. Dase, et al., *A Proposed Research Framework for Distributed Group Support Systems, Proceedings of the 28th Annual Hawaii International Conference on System Sciences*, vol. 4, pp. 42-51, (1995).

* cited by examiner

*Primary Examiner*—Khanh Quang Dinh
(74) *Attorney, Agent, or Firm*—Akerman-Senterfitt

(57) ABSTRACT

A method of delivering targeted application generated information to multiple users can include generating data items to be output to classes of at least one user and associating the data items with data categories. The data categories can be associated with at least one of the classes of users. The data items can be distributed to classes of users that are associated with the data categories of the data items.

10 Claims, 2 Drawing Sheets

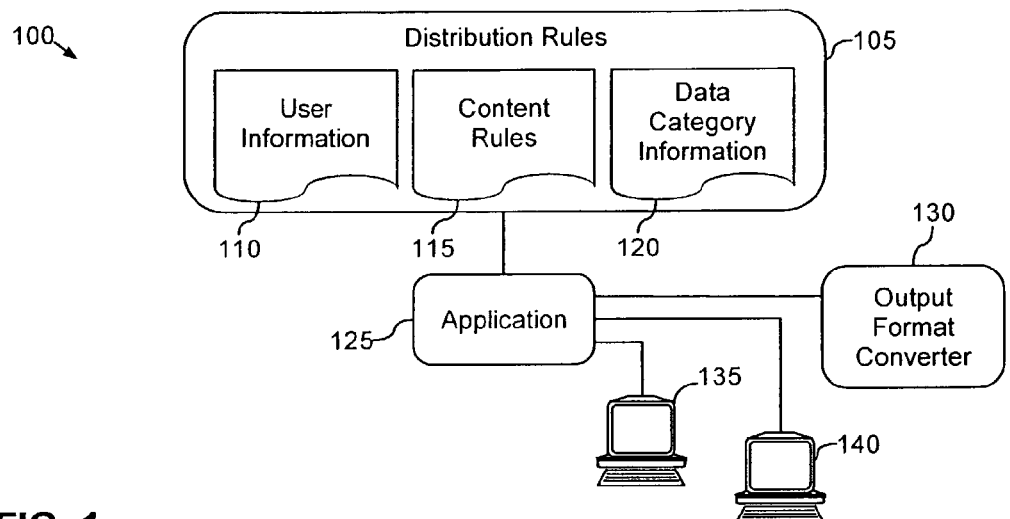

FIG. 1

| DATA DESIGNATOR | DATA CATEGORY | USER CLASS |
|---|---|---|
| 1 | Financial Data | Managerial Staff |
| 2 | Sales Data | Managerial Staff and Salespersons |
| 3 | Technical Data | All Employees |
| 4 | General Product Data | Customers and All Employees |

FIG. 2

| DATA DESIGNATOR | MEDIA FORMAT | USER CLASS |
|---|---|---|
| 1 | Live interaction | Team Member |
| 2 | Electronic mail and attachment | Team Manager |
| 3 | Electronic mail, attachment, meeting summary | Executive Manager |

FIG. 3

TARGETED INFORMATION DELIVERY TO MULTIPLE USERS

BACKGROUND OF THE INVENTION

1. Technical Field

The invention relates to the field of information technology, and more particularly, to providing information to multiple recipients in a targeted manner.

2. Description of the Related Art

Many different types of applications generate information that can be shared among multiple participants. For example, the output of presentation software such as Lotus Freelance® available from Lotus Development Corporation of Cambridge, Mass., can be viewed not only on the presenter's computer, but also on a display that can be viewed by a larger audience, such as a large projection display of the sort typically used with portable computers. Other applications including electronic meeting software such as Lotus Sametime®, also available from Lotus Development Corporation, can present data that can be simultaneously viewed by the owner of the meeting as well as the meeting participants in a distributed computing environment.

Although conventional applications can be configured to present data to multiple participants, such applications provide the same data to each participant. That is, such applications provide the same data to each participant without regard for the type of data being provided or the class of user to whom the data is being provided. Thus, if a need arises to select only a subset of the total data output based on who is to receive the data, conventional applications cannot perform such actions. For example, during a business presentation, a presenter may rely upon "speaker notes" when presenting audio and/or visual material to an audience. With conventional presentation software, the audience sees the same screen content as the presenter. Thus, the presenter must prepare hard copy notes to prevent the audience from viewing the speaker notes. Similarly, in the case of conventional meeting software, although the owner or initiator of a meeting can choose who may and may not participate in a given meeting, each user can view everything that the meeting owner elects to share.

The problem further can be exacerbated when the information to be presented is not generated until after multiple participants have already begun participating in a session. Conventional applications not only rely on the meeting owner to determine which items may or may not be shared with other participants, but typically require such determinations be made prior to a meeting or other presentation session, or prior to generating the data to be shared. In situations where data is generated and shared dynamically during an online meeting, however, one may not be able to determine whether the resulting data is public or private until the data is generated and the results can be evaluated. This can be especially true in cases where the actual content of the data determines whether the information is of a public or private nature. Presently, conventional applications do not allow for dynamic determinations of whether data is public or private, nor do conventional applications evaluate data based upon the content of the data.

SUMMARY OF THE INVENTION

The invention disclosed herein provides a solution for delivering targeted information to multiple users based upon a category of the information, the designated class of user, as well as the actual content of the data being presented. The data can be dynamically targeted to one or more users according to the aforementioned factors. Accordingly, one aspect of the present invention can include a method of targeted information delivery. The method can include generating data items to be output to classes of at least one user.

The data items can be associated with data categories. The data categories can be associated with at least one of the classes of users. For example, the category associations and the user class associations with the data items can be determined by applying distribution rules to the data items. The distribution rules also can include content rules. Accordingly, the data item content can be compared with the content rules. For instance, the content of the data items can be determined. From comparing the content rules with the data item content, one of the user classes can be disassociated from the data category of the data items. Alternatively, a different one of the user classes can be associated with the data category of the data items according to the data item content and the content rules. Notably, as the content rules can specify associations between the data item content and the user classes, the associating step can take place dynamically during a session wherein the data items are generated for presentation to one or more classes of user.

The data items can be distributed to classes of users that are associated with the data categories of the data items. Thus, the classes of users receive only data items which the classes of users are authorized to receive. In providing the data to the classes of users, a preferred media format can be determined for distributing the data items to the various classes of users. The media format of the data items to be provided to the classes of users can be converted to the determined preferred media format.

BRIEF DESCRIPTION OF THE DRAWINGS

There are shown in the drawings embodiments which are presently preferred, it being understood, however, that the invention is not limited to the precise arrangements and instrumentalities shown.

FIG. 1 is a schematic diagram illustrating a system for providing targeted information to multiple users in accordance with the inventive arrangements disclosed herein.

FIG. 2 is a table illustrating one aspect of the distribution rules of FIG. 1.

FIG. 3 is a table illustrating another aspect of the distribution rules of FIG. 1.

DETAILED DESCRIPTION OF THE INVENTION

Figure 4:
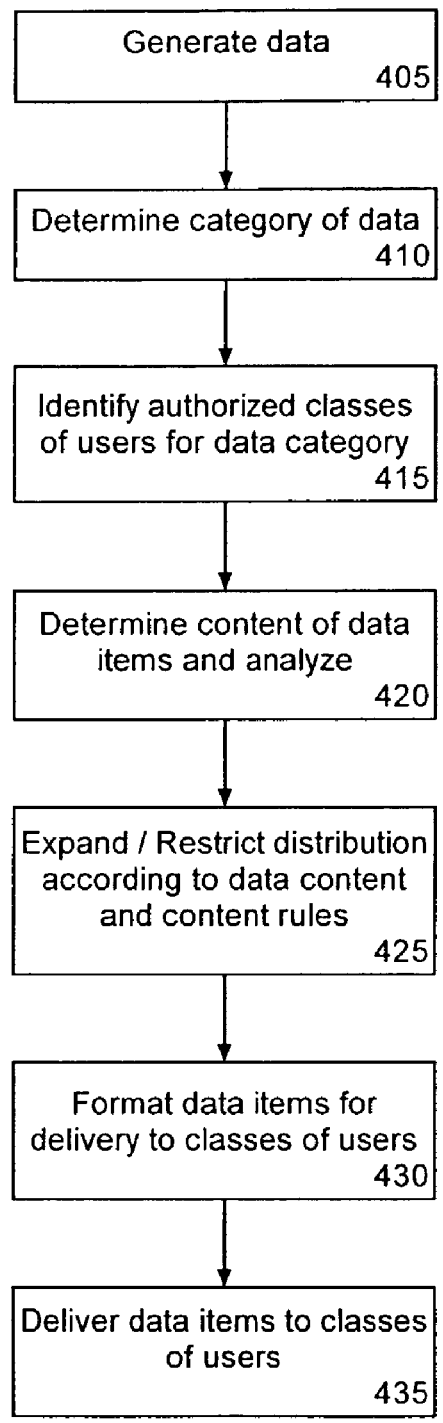
FIG. 4 is a flow chart illustrating a method of providing targeted information to multiple users in accordance with the inventive arrangements disclosed herein.

The invention disclosed herein provides a solution for delivering targeted information to multiple users. In particular, the present invention provides for the distribution of information to one or more users or classes of users according to the type of information to be delivered. Thus, the present invention not only can deliver selected items of information, but also can deliver those selected items of information to particular users or classes of users. Notably, determinations as to which data items are to be provided as well as to whom those data items are to be provided can be made before, during, and after the information is generated in an application. For example, such determinations can be made dynamically as the information is generated, or shortly thereafter, during a collaboration session or presentation session. Moreover, in addition to distributing data items according to the data item type and the class of user, the distribution of data items can be dependent upon the actual content of the data items.

FIG. 1 is a schematic diagram illustrating a system 100 for providing targeted information to multiple users in accordance with the inventive arrangements disclosed herein. As shown in FIG. 1, the system 100 can include a set of distribution rules 105, an application 125, and an output format converter 130. The distribution rules 105 can include several types of rules and/or data specifications including user information 110, content rules 115, and data category information 120. The system 100 can facilitate the delivery of targeted information to one or more users and/or user computer systems 135 and 140.

The application 125 can be any of a variety of applications which provide information to one or more users such as collaborative work applications, presentation applications, online conferencing applications, spread sheet applications, word processing applications, financial applications, and the like. The application program can be configured to generate data and compare that data with distribution rules to be discussed in greater detail. The distribution rules can be included within the application 125 or can be located external to the application 125. Alternatively, the application program 125 can be configured to provide output to a system for comparing the output data to the distribution rules and routing the data as necessary.

The distribution rules 105 can be used to specify to whom particular data items are to be provided as well as the formatting and means of delivery of the data items. The user information 110, for example, can specify one or more users who can interact with the application 125 in a given session. This information, however, also can be specified in the application 125. For example, if the application 125 is an electronic meeting application such as Lotus Sametime® which is available from Lotus Development Corporation of Cambridge, Massa., the user information 110 can specify which users are to be participating in the online meeting. In the case where application 125 is a presentation application for displaying audio and/or visual material, the user information 110 can specify a master user, for example a presenter, and one or more users who will be viewing the presentation material.

The user information 110 can associate users with one or more user classes, each of which can include one or more users. Additionally, the user information 110 can associate a media format with the users and/or the user classes. Thus, users can be assigned to a class such as employee, manager, executive, or any other suitable class designation or logical grouping depending upon the particular application 125 and/or information to be presented. The media format can specify the type of output to be provided to user classes and/or individual users specified in the user information 110. For example, the media type can specify that information is to be presented as audio, video, data intended as input to another application, electronic mail, or markup language formatted data.

In illustration, the media format can specify that information to be sent to managers can be specified as a Hypertext Markup Language (HTML) document to be presented through a visual browser, as text within or attached to an electronic mail, or as audio output to be presented through a speech browser. Accordingly, the user information 110 can specify delivery information such as the electronic mail address for one or more users, a directory or address where a markup language document can be stored, network addresses of computer systems to receive data, and the like.

The media format also can specify a designated output device to which any data generated by the application 125 can be provided. For example, the media format can associate particular data categories with the display of a computer while other data categories are directed to an external visual display such as a projection display so that other users or attendees to a presentation can view the presentation materials. Similarly, in the case of several networked computer systems, the network address of each computer system can designate the output device. Thus, information can be delivered to selected computer systems depending upon the data category and class of user at each computer system.

The content rules 115 can be used to examine the content of particular data items, objects, data structures, and/or variables. In particular, the content rules can specify which content is to be presented to particular user classes. The content rules 115 allow the system 100 of FIG. 1 to dynamically evaluate data that is generated during an online meeting, presentation, or the like, to determine who should be granted access to the information as it is developed. For example, in the case of an employee workgroup using a financial application to generate financial data, a content rule can specify that should the value of a particular data item exceed a threshold amount, then the value can be accessed only by managerial level persons, or a managerial subset of the workgroup class. Accordingly, despite the fact that members belonging to various workgroup classes are working on the same project, the output can be dynamically classified to prevent unauthorized persons from accessing or viewing the data. As a result, different members of a given workgroup can receive different information depending upon that user's class. Thus, the delivery of the data can be either limited or expanded to additional user classes dependent upon the content rules.

The data category information 120 can associate particular data items with various data item categories. For example, various objects, data structures, algorithm outputs, and the like can be associated with a particular data item category such as financial, technical, human resource, or any other suitable data item designation. Additionally, the data category information 120 can specify associations between data categories and user classes. Notably, as the user classes can include one or more users, the data category information 120, similar to the media formatting information of the user information 110 and content-rules 115, can specify categories on a user class basis as well as an individual user basis.

The format converter 130, for example a transcoder, can dynamically filter and reformat content from one format or markup language to another, thereby permitting content to be converted from one modality to another. The format converter 130 can receive data items, reformat the data items, and send the data items out directly to recipients (not shown). Alternatively, as shown in FIG. 1, the format converter 130 can provide the reformatted data items back to the application 125 for distribution. For example, material to be represented visually can be reformatted for audible presentation. Thus, content specified in extensible markup language (XML) format can be translated into hypertext markup language (HTML), voice extensible markup language (VoiceXML), or other formats such as wireless application protocol (WAP). Additionally, content can be formatted for delivery via electronic mail or can be published to a server for access via a browser. An example of a transcoder is the IBM® WebSphere® Transcoding Publisher application available from International Business Machines Corporation of Armonk, N.Y.

In illustration, one embodiment of the invention can include a presentation application 125 where a primary user or administrative level user has designated particular data items or material to be presented as either public or private. In this embodiment, no users need be associated with classes as the delivery of data can depend solely upon the designation of the data as public or private. The private data items such as any speaker notes, for example, can be routed to the private display of the primary user, in this case a speaker. The public information, can be routed to a large public display such as a projector display. Still, some information such as the slides can be annotated as both private and public so that the speaker and the audience may view the slides. A similar approach can be utilized, for example, where public information is published to a server as a markup language document for viewing in a browser and private information is distributed as an electronic mail to selected users on a computer communications network.

Other embodiments of the invention can include, but are not limited to, a financial application where a user wishes to share limited asset information with a financial advisor having access to the financial application and the financial advisor desires to restrict client access to commission and other expense related information; medical applications where the patient does not wish to share selected personal information with a doctor while the doctor does not wish to share particular operational data with the patient; or legal software where different categories of information are to be delivered to a judge or arbitrator, opposing attorney, clients, and the like.

Accordingly, the system 100 of FIG. 1 can distribute items of application generated data to selected recipients. The system of FIG. 1 further can distribute the items of data whether or not the data was dynamically generated just prior to its distribution. For example, if the items of data are dynamically generated during a collaborative session of multiple users, the data items can be dynamically categorized and classified for distribution to particular recipients. The data items then can be delivered in accordance with the determined data item categorizations and classifications.

FIG. 2 is a table illustrating one aspect of the distribution rules of FIG. 1. As shown in FIG. 2, the table includes a data designator column, a data category column, and a user class column. Data items can be assigned or associated with a particular data designator, which in turn can be associated with one or more data categories and user classes. Notably, the user classes as well as the data categories can be varied according to the particular application that is to deliver targeted information as well as the environment in which that application is used. According to the example of FIG. 2, data types can include financial data which can be made available to managerial staff only, sales data which can be made available to both managerial staff and salespersons, technical data which can be made available to all employees, as well as general product data which can be made available to customers and all employees. One or more data categories and user classes can be associated with each data designator.

FIG. 3 is a table illustrating another aspect of the distribution rules of FIG. 1. As shown in FIG. 3, the table can include a data designator column, a media format column, and a user class column. The media format column can specify the method and/or means for delivering data to users. As specified by the media format column, team members can receive information through live interaction, for example through their personal display or any one of multiple publicly viewable display screens. Team managers can receive information via electronic mail with or without attachments, and executive managers can receive information via electronic mail, attachments, as well as receive additional meeting summary information specified within the attachment or the body portion of the electronic mail. Still other delivery methods can include Web sites, Intranet sites, and the like.

The media format also can specify a format to which the data is to be converted. For example, the data can be reformatted from XML to HTML or VoiceXML, can be included within an electronic mail, or sent via instant messaging. In the case where data is to be sent through a computer communications network, the media format can specify one or more destination electronic addresses. Similarly, if data is to be published to a network location, that location and/or address can be specified within the media format information, or can be distributed to one or more user classes via electronic mail, a hyperlink on an intranet site, and/or instant messaging.

FIG. 4 is a flow chart illustrating a method 400 of dynamically providing targeted information to multiple users in accordance with the inventive arrangements disclosed herein. The method 400 can begin in a state wherein multiple users are participating in a collaborative environment or are logged onto a computer communications network. Although data can be associated with one or more data categories prior to the data being generated, the method 400 illustrates the case where data can be dynamically associated with one or more types after and/or during the generation of the data, that is while a collaboration session is in progress.

The method can begin in step 405 where data is generated. The data can be generated by an application program which has been configured to access a set of distribution rules. As mentioned, the distribution rules can be included as part of the application program, or alternatively, the application program can be configured to provide information to a data processing engine for comparing and/or filtering the output data in accordance with the distribution rules. In any case, in step 410, the category of data can be determined. For example, the data category can be identified by any of a variety of means such as referencing a corresponding variable name or a function of the application responsible for generating, storing, and/or outputting the data, noting the placement of the data within a message or data stream wherein the placement indicates the data category, detecting data category identifiers which can be included in the data output, and the like. According to one aspect, the data can be provided with a data designator which can be compared with the distribution rules for specifying a data category, one or more associated user classes, and a media format.

For example, a human resources application can generate a variety of different forms of information including financial information, employee personal information, and marketing information. Each item of data output by the system can be identified as belonging to a particular data category. Notably, the data item categories can be refined to varying degrees of specificity. For example, while a general financial information category can exist, so too can a collections data category, expenses data category, salary data category, and the like. Thus, data such as social security numbers and salary that is categorized as highly confidential personal data can be provided only to those employees having a need to know designated by a particular user class, while less sensitive data such as one's job title can be readily available. Accordingly, in step 415, the authorized classes of users can be identified. That is, the classes of users that are associated with, and thus, are authorized to receive and access the respective data categories can be identified.

In step 420, the content of the data can be determined and analyzed according to one or more content rules. The content of the data items can be determined as the data items are calculated and the analysis can be performed with reference to the content rules. For example, in the case of a collaborative financial work environment, although a manager class typically may be provided with financial data, some financial data, such as results over a particular dollar amount, may be restricted from the manager class and intended for executive management use only.

Taking another example, data items having content specifying a dollar value exceeding a predetermined threshold can be considered private or confidential. Thus, with regard to a presentation application where data is generated dynamically during the presentation, depending upon the audience, particular items of information exceeding a dollar amount threshold can be considered private, and therefore, can be diverted from a public viewing device, masked on the public viewing device, or can be provided only to the presenter's display. Notably, the content rules can specify multiple thresholds for analyzing data item content. For example, while dollar values above a threshold may be accessed by executive staff only, and dollar values within a mid-range also may be accessed by salespersons, dollar values below a third threshold may be accessed in an unrestricted manner.

In step 425, the distribution of the data items can be expanded or restricted based upon a comparison of the data item content to the content rules. As previously illustrated, particular data items can be distributed only to those persons authorized to access the data. For example, the content rules can specify that one or more classes of users are to receive the analyzed data items or that one or more classes of users are not to receive the analyzed data items. In consequence, comparison of the data item content with the content rules can lead to an expansion of the user classes designated to receive the data items as well as a reduction in the classes of users designated to receive the data items.

Thus, particular items of data can be provided to particular classes of users as determined by application of the content rules to the content of the data items. In this manner, data can be dynamically directed to one or more users not only based upon the category of the data, but also according to the content of the data. Any of a variety of content rules can be specified based upon the particular data item to be analyzed, as well as the data category, user class, and media format specified in the distribution rules.

In step 430, the data items can be formatted for delivery to the classes of users associated with the data type. As this information can be specified by the media type, the output format converter then can perform any transcoding as may be required to reformat the data for delivery to authorized users in a suitable or user specified format. In step 435, the data items can be delivered to the users. While the format converter may be capable of transmitting one or more different media types to various users, for example, distributing electronic mails, instant messages, and/or publishing markup language documents, the format converted material also can be provided back to the application for distribution. Depending upon the method of delivery, the users can interact with the application that generated the data items to provide responses and/or additional data.

The present invention provides a solution for selectively distributing data to multiple users in a distributed environment. According to the inventive arrangements disclosed herein, the data can be categorized, associated with one or more different users and/or user classes, analyzed for content, and format converted for delivery in any of a variety of suitable formats. Content rules further can specify where and how the information is to be delivered.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of delivering application generated information to multiple users comprising:

specifying a plurality of users participating in a collaboration session, wherein said users enter numeric data items during said collaboration session;

assigning at least one user to at least one class;

receiving numeric data items from said plurality of users during the collaboration session;

computing a numeric outcome from an evaluation of said numeric data items;

analyzing the numeric outcome that is generated to determine at least one of said classes that should be granted access to said numeric data items as said numeric outcome is computed in real-time with reference to content rules, wherein if said numeric outcome is greater than a predetermined threshold, granting access to at least one class, if said numeric outcome is less than a predetermined threshold, denying access to at least one class, associating said numeric outcomes with data categories corresponding to at least one of said classes of users;

distributing said numeric data items to classes of users with granted access that are associated with said data categories of said data items;

wherein said associating step takes place dynamically during the collaboration session wherein said data items are generated for presentation to at least one class of user;

wherein said distributing step further comprising:

determining a preferred media format for distributing said data items to said classes of users; and converting a media format of said data items to be provided to said classes of users to said determined preferred media format.

2. The method of claim 1, said associating step further comprising:
   determining said data category associations and said user class associations by applying distribution rules to said data items.

3. The method of claim 2, wherein said distribution rules comprise content rules, said associating step further comprising:
   comparing said data item content with said content rules, wherein said content rules specify associations between said data item content and said user classes.

4. The method of claim 1, said associating step further comprising:
   determining content of said data items for granting access; and
   disassociating one of said user classes from a data category of said data items according to said data item content.

5. The method of claim 1, said associating step further comprising:
   determining content of said data items for granting access; and
   associating a different one of said user classes with a data category of said data items according to said data item content.

6. A machine-readable storage, having stored thereon a computer program having a plurality of code sections executable by a machine for causing the machine to perform the steps of:
   specifying a plurality of users participating in a collaboration session, wherein said users enter numeric data items during said collaboration session;
   assigning at least one user to at least one class;
   receiving numeric data items from said plurality of users during the collaboration session;
   calculating a numeric outcome from an evaluation of said numeric data items;
   analyzing the numeric items outcome that is generated to determine at least one of said classes that should be granted access to said numeric data items as said numeric outcome is developed computed in real-time with reference to content rules, wherein
   if said numeric outcome is greater than a predetermined threshold, granting access to at least one class,
   if said numeric outcome is less than a predetermined threshold, denying access to at least one class,
   associating said item numeric outcomes with data categories corresponding to at least one of said classes of users;
   distributing said numeric data items to classes of users with granted access that are associated with said data categories of said data items; and
   wherein said associating step takes place dynamically during the collaboration session wherein said data items are generated for presentation to at least one class of user;
wherein said distributing step further comprising:
   determining a preferred media format for distributing said data items to said classes of users; and
   converting a media format of said data items to be provided to said classes of users to said determined preferred media format.

7. The machine-readable storage of claim 6, said associating step further comprising:
   determining said data category associations and said user class associations by applying distribution rules to said data items.

8. The machine-readable storage of claim 7, wherein said distribution rules comprise content rules, said associating step further comprising:
   comparing said data item content with said content rules, wherein said content rules specify associations between said data item content and said user classes.

9. The machine-readable storage of claim 6, said associating step further comprising: determining content of said data items for granting access; and disassociating one of said user classes from a data category of said data items according to said data item content.

10. The machine-readable storage of claim 6, said associating step further comprising: determining content of said data items for granting access; and associating a different one of said user classes with a data category of said data items according to said data item content.

* * * * *